No. 858,975. PATENTED JULY 2, 1907.
H. A. GRAHAM.
THILL ATTACHING AND RELEASING DEVICE.
APPLICATION FILED MAY 12, 1906.

Fig. 1.

Fig. 2.

Inventor
Homer A. Graham
By Victor J. Evans
Attorney

Witnesses
Frank B. Hoffman
K. Allen

UNITED STATES PATENT OFFICE.

HOMER A. GRAHAM, OF ONECO, FLORIDA.

THILL ATTACHING AND RELEASING DEVICE.

No. 858,975.   Specification of Letters Patent.   Patented July 2, 1907.

Application filed May 12, 1906. Serial No. 316,558.

*To all whom it may concern:*

Be it known that I, HOMER A. GRAHAM, a citizen of the United States, residing at Oneco, in the county of Manatee and State of Florida, have invented new and useful Improvements in Thill Attaching and Releasing Devices, of which the following is a specification.

My invention relates to thill attaching and releasing devices, and its primary object is to provide a device of this character by means of which a horse may readily and quickly be detached from a vehicle.

A further object is to provide a device which may be applied to any construction of vehicle, one which is simple and durable, and which may be manufactured and sold at a comparatively low cost.

With the above and other objects in view, the invention consists in the construction, combination and arrangement of parts hereinafter fully described, claimed and illustrated in the accompanying drawing, wherein:

Figure 1 is a view in elevation of the front axle of a vehicle, illustrating the application of my improved device, the thills being removed, and Fig. 2 is a perspective view, the thills being shown in dotted lines.

Referring to the drawings by reference numerals, 2 designates the front axle, 3 the thill irons and 4 the thills of a vehicle, all being of the usual form and construction.

A bar 5 has its ends formed to provide coupling pins 6, which are adapted to connect the thills 4 to the thill irons 3. The bar 5 is adapted to be moved longitudinally to withdraw the pins 6 from the thill irons 3 when it is desired to release the thills 4. A bracket 7 is secured to the under side of the axle 2 at a point near one of its thill irons 3 by means of a clip 8, and it is provided with a depending arm 9. An angle lever has the end of its vertical member 10 bent at right angle to its plane to provide a pivot post, and has the end of its horizontal member 12 bent to provide a foot piece 13. The angle lever is fulcrumed upon the arm 9 through the medium of the pivot post, and is pivotally connected to the bar 5 by means of a rivet 11 which passes through the bar and through the vertical member 10. As the angle lever is mounted upon the bracket through the medium of the arm 9 and the pivot post, the horizontal member 12 is disposed above and in longitudinal alinement with the bar 5, and the foot piece 13 is disposed in a position readily accessible to the occupant of the vehicle. A downward pressure upon the foot piece will move the bar 5 longitudinally and withdraw the coupling pins 6 from the thill irons 3, thus releasing the thills 4. The coupling pins 6 are normally held in position in the thill irons 3 by means of a coiled spring 14 which has one of its ends secured to the bar 5 and its other end to the axle 2.

It should be apparent from the above description, taken in connection with the accompanying drawing, that I provide a device by which the thills may be secured to the thill irons and by which the thills may be readily and quickly released should it be found necessary to detach the horse from the vehicle. It should also be apparent that the device may be applied to any construction of vehicle; that the same is simple of construction, and that it may be manufactured and sold at a comparatively low cost.

Changes in the form, proportions and minor details of construction may be made within the scope of the claims without departing from the spirit or sacrificing any of the advantages of the invention.

Having fully described and illustrated my invention, what I claim is:

1. The combination with an axle, of thill irons, thills, a bar adapted to connect the thills to the thill irons, a bracket secured to the axle and provided with a depending arm, and an angle lever pivotally secured to the arm through the medium of its vertical member, the horizontal member of the lever being disposed above and in longitudinal alinement with the bar, whereby power applied to the horizontal member will move the bar longitudinally and release the thills.

2. The combination with an axle, of thill irons, thills, a bar connecting the thills to the thill irons, a bracket secured to the axle and provided with a depending arm, and an angle lever having the end of its vertical member disposed at right angle to its plane to provide a pivot post and the end of its horizontal member formed to provide a foot piece, said lever being pivotally mounted upon the arm of the bracket through the medium of the pivot post, whereby power applied to the foot piece will move the bar longitudinally and release the thills.

HOMER A. GRAHAM.

Signed in our presence—
 ALEX C. ROESCH,
 H. S. CLARK.